Feb. 19, 1935.  J. J. McDONALD  1,992,083
SKETCHING DEVICE
Original Filed Sept. 5, 1933   2 Sheets-Sheet 1

Inventor
J. J. McDonald
By [signature]
Attorney

Feb. 19, 1935. J. J. McDONALD 1,992,083
SKETCHING DEVICE
Original Filed Sept. 5, 1933  2 Sheets-Sheet 2
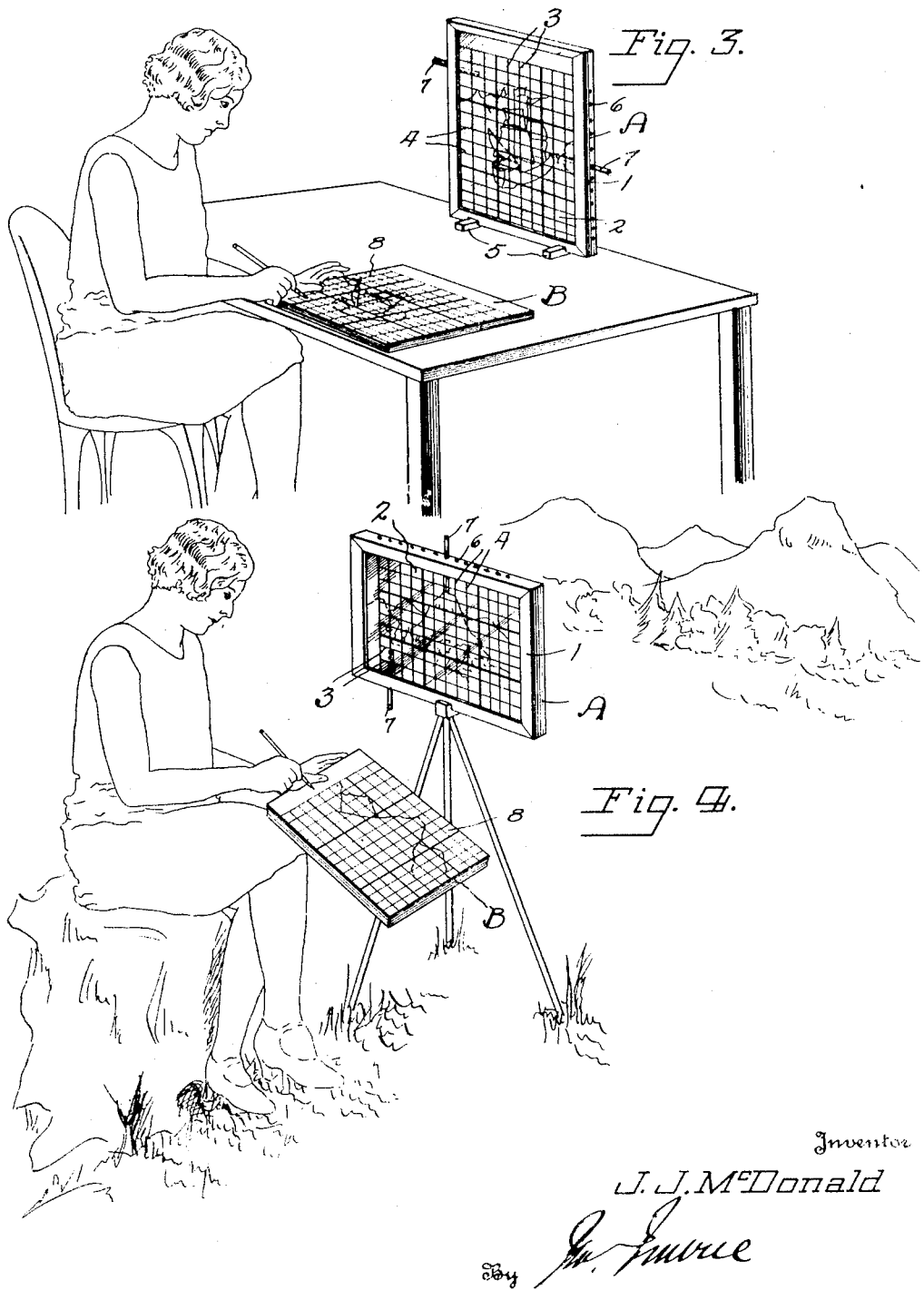
Inventor
J. J. McDonald Patented Feb. 19, 1935

1,992,083

UNITED STATES PATENT OFFICE 1,992,083

SKETCHING DEVICE

James J. McDonald, San Jose, Calif.

Application September 5, 1933, Serial No. 688,235
Renewed October 9, 1934

4 Claims. (Cl. 35—12)

This invention is directed to an improvement in mechanical aids in drawing or sketching, which for convenience will be hereinafter termed a sketch o'graph, and which in use serves as a material aid in reproducing drawings from sketches, perspectives in landscapes, still life, models, etc.

The primary object is the provision of a view finder through which the sketch or object to be reproduced is visible, with the surface of the view finder marked in a particular manner to definitely segregate portions of the sketch or object to be reproduced and thus determine their relation, with the marked parts of the surface through which they are seen combined with a reproduction sheet identically marked with that of the surface through which the objects are seen to serve as an aid in reproducing the drawing according to the marked parts of the surface through which the object is seen and the reproducing sheet.

While the surface of the sheet through which the object to be reproduced is visibly marked in a particular manner, as by squares or the like, it is apparent that each particular part of the object to be reproduced will bear a definite relation to a particular square, and if the reproducing sheet is similarly marked and the sheet on which the object to be drawn is placed over the reproducing sheet, the squares in the latter will be visible and the object may be drawn in the same relation to the similar squares as on the sheet through which the object is viewed. A definite and proper guide is thus provided to aid in drawing the object and very materially assists in an accurate reproduction.

Furthermore, the invention contemplates the use of means by which the view finder may be accurately aligned with selected parts of an object viewed through the finder and to be reproduced, thereby permitting the view finder, if accidentally disturbed or if used at subsequent periods, to be accurately placed in exact accordance with the original position to insure accuracy in reproduction.

A further object is the utilization of means such as a colored celluloid sheet or the like to enable the view finder to render accurately visible the object viewed therethrough without distraction from the sun or high lights.

The sketch o'graph involves two distinct parts, both absolutely essential to accurate reproduction, one termed the view finder through which the object to be reproduced is visible, with the surface of the view finder accurately marked to predetermine the relation of all portions of the object to be reproduced to the marked parts, and a second element, termed a reproduction sheet, which is marked in exact accordance with the markings on the sheet of the view finder and which reproduction sheet is to be placed beneath the sheet on which the drawing is to be reproduced so as to render the markings of the reproduction sheet visible.

The invention in the preferred form is illustrated in the accompanying drawings, in which:—

Figure 4 is a similar view illustrating another use of the sketch o'graph.

Figure 5 is a plan view of an element forming part of the sketch o'graph and for a particular use.

Figure 1:
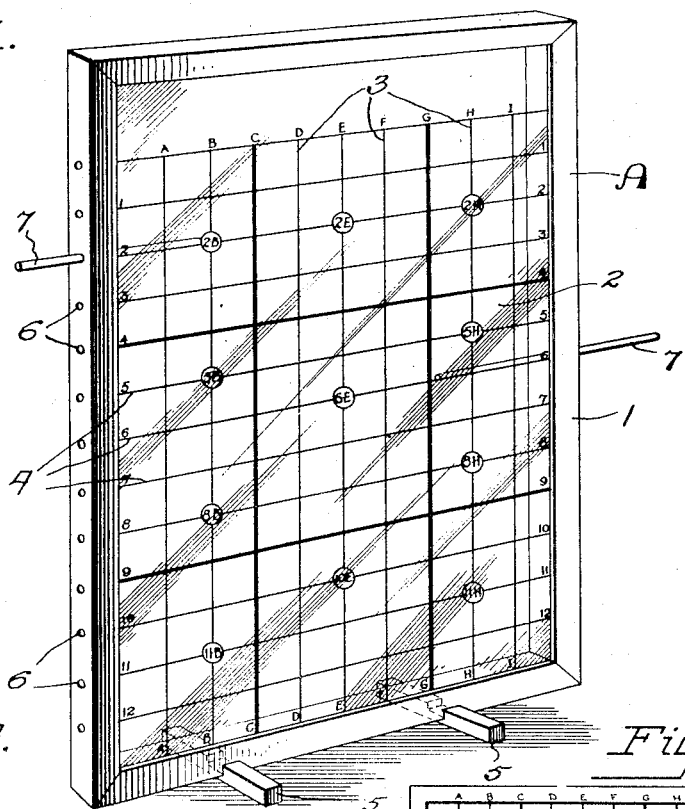
Figure 1 is a perspective view of the view finder.
Figure 2:
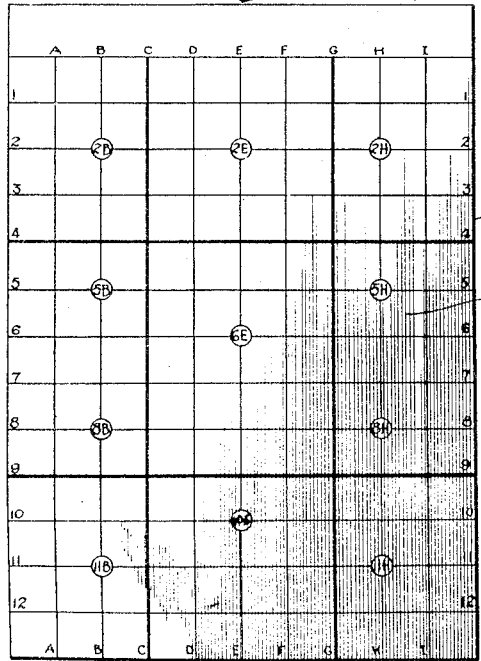
Figure 2 is a plan view of the reproduction sheet.

The improved sketch o'graph includes a view finder A and a reproduction sheet B. The view finder includes a rectangular frame 1 formed in any usual or appropriate manner to removably receive and support a view sheet 2. The view sheet 2 is marked with uniformly spaced vertical and horizontal lines 3 and 4 to define a series of squares. The horizontal lines are preferably numbered as indicated and the vertical lines lettered, though obviously any differentiating characters may be used for this purpose. Certain of the lines are either distinctive in color or in appearance being heavier or lighter than the remaining lines. These distinctive lines, which in the drawings are indicated at C and G in vertical direction and 4 and 9 in horizontal direction, also define squares which are uniform and include a greater area than the squares defined by the first mentioned lines, as will be apparent.

The frame 1 is designed to be supported either on the end or side in an upright position, and to this end there are provided removable feet 5 in the form of bars notched to accurately receive the framing bars and of sufficient length to support the frame in upright position. Of course, the feet may engage the end bar or side bar, according to the desired disposition of the frame.

One or more of the framing bars are formed with openings 6 to removably receive rods 7 which are thus permitted to project beyond the frame proper from either or both sides and either or both ends to serve as guides in a manner to be later referred to. The reproduction sheet comprises a sheet 8 marked with vertical and horizontal lines and with the distinctive lines exactly in accordance with those of the view sheet 2.

Figure 3:
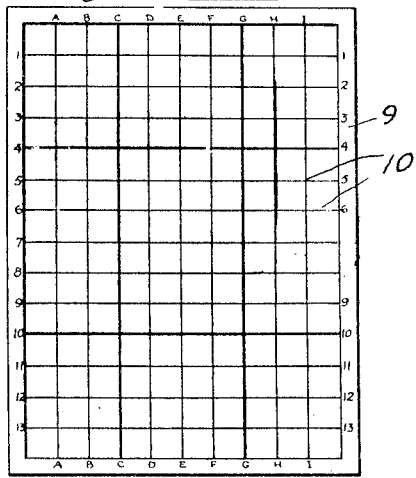
Figure 3 is a perspective view illustrating one use of the sketch o'graph.

In the use of the sketch o'graph for reproducing from sketches or drawings, the sketch or drawing to be reproduced is placed in the frame 1 in rear of the view sheet 2 so that the picture is visible through the transparent view sheet 2 and is divided by the lines on that sheet. In reproducing from this drawing, the reproduction sheet 8 is placed beneath a drawing paper through which the lines of the reproducing sheet are slightly visible. The drawing is carried out on the drawing paper in strict accordance with the appearance of the picture through the view sheet. As each portion of the picture has some relation to a particular square of the view sheet, the reproduction drawing will follow this picture in strict accordance with the squares on the respective sheets. Thus, for example, the portion of the picture appearing in the square bounded by the lines 1 and 2 and B and C will be reproduced in the same square on the drawing sheet made visible by the use of the reproduction sheet. Thus an accurate reproduction of the sketch or drawing may be made, the squares serving to define the location of the lines of the drawing with respect to the lines of the squares and thus tending to materially simplify and render extremely accurate the reproduction, even by one unskilled in drawing. This use of the sketch o'graph is illustrated more particularly in Figure 3.

In Figure 4 the sketch o'graph is shown as reproducing an object. In this case, the view finder may be mounted upon a tripod or other support so that the object to be reproduced is visible through the view finder and its various parts arranged with particular relation to certain defined squares marked on the view sheet. The reproduction sheet placed beneath the drawing paper and visible therethrough as before serves as a guide corresponding exactly to the view sheet and which through the medium of the squares on the view sheet and the squares on the guide may serve to accurately guide the artist in reproducing in each similar square of the drawing paper as such squares are determined by the reproduction sheet the lines appearing in that square in the view sheet.

The view sheet is preferably of celluloid or other transparent panel, and the reproduction sheet may be celluloid or heavy paper. The frame 1 is, of course, provided with any conventional means by which the view sheet and also a picture or sketch may be removably held therein at will. The distinctive lines on the view sheet are of particular importance as special markers or guide lines when sighting through the frame for the reproduction of a distant object. These special or distinctive lines may be lined up with particular parts of the object being viewed, and this alignment may be maintained or accurately repositioned at any time. Thus, an artist reproducing an object and unable to complete the work at one sitting may return the next day, and by reason of the distinctive lines align the view sheet exactly as it was positioned on the previous day and thus continue or complete the drawing.

Furthermore, the rod markers may be moved through the frame and constitute positive points of identification for checking the position of the work. That is to say, these rods may be moved through the frame and brought to bear upon a particular point of the object visible through the view sheet and thus serve as additional means for accurately re-positioning the view sheet with respect to the object at any subsequent time. Of course, any number of rod markers may be used for this purpose, it being understood that the openings in the frame are arranged preferably to accommodate the rods either in alignment with each vertical and horizontal line or at intermediate points. Furthermore, if the sketch o'graph is used in outdoor work in the sunlight or high lights, a transparent sheet of colored celluloid may be placed behind the view sheet and thus prevent the sunlight or high lights from interfering with the proper visibility of the object to be reproduced.

The sketch o'graph is particularly useful in drawing perspectives of landscapes, houses and the like, as it enables the user to accurately line up the object and determine the perspective by the vertical and horizontal lines, as will be obvious. The vertical and horizontal lines 4 and 5 may in themselves be distinctive in appearance, i. e. considering the vertical and horizontal lines one-half inch apart, each alternate line, both horizontal and vertical, may be heavier than the intermediate lines, thus dividing the view sheet into half inch squares by light lines and into inch squares by heavy lines. The distinctive lines are further to be distinguished from all the remaining lines, as these distinctive lines form guides for positioning the view finder in predetermined relation with a definite part or parts of the object to enable the view finder to be repositioned in exactly the same relation, if necessary or desired.

The frame 1 is preferably of wood, the view sheet of celluloid and the reproduction sheet of celluloid or cardboard, though it is to be understood that while preferring such detail, there is no restriction as to the size or materials of which the various parts may be made so long as they permit the result sought and above outlined.

As shown in Figure 5, there is provided an element for use as a part of the sketch o'graph and designed particularly for cooperation with canvases on which a painting or picture is to be reproduced. This element comprises a frame, as wood or the like, indicated at 9, the included area being bridged by vertical and horizontal wires 10 defining spaces or markings in exact accord with the markings on the view sheet 2. These wires may be distinguished one from the other by the fineness of the wires exactly in accordance with the distinctive lines on the view sheet and, if desired, the main distinctive lines shown at C and G and 4 and 9 on the view sheet may be colored. In other words, this element is in exact accord with the view sheet, except that the lines marked on the view sheet are in the element made up of wires so that the spaces defined by these wires are completely open.

In reproducing a picture, i. e. for example a painting, it may be viewed through the view sheet in the manner heretofore described of the sketch or at a distance, and in reproducing the element shown in Figure 5 is placed over the canvas on which the reproduction is to be made. The original painting as seen through the view sheet according to the respective squares thereon is sketched on the canvas in accordance with the similar squares of the wire element applied over the canvas. After the completion of the sketching, the wire element may be removed and the lines which have necessarily been interrupted owing to the presence of the wires may be completed. Then if the reproduction is to be colored, the wire screen element may be restored to its position on the canvas and the coloring proceeded with according to the coloring defined by the spaces in the view sheet.

This provides for extremely accurate reproductions of paintings and other like objects onto a canvas through which ordinarily the reproduction sheet B would not be visible. This wire screen element is, therefore, a necessary characteristic part of the sketch o'graph as a whole and is to be considered as a material element of the present invention.

I claim:—

1. A sketching device including a frame, a transparent view sheet removably carried thereby, and a rod slidably cooperating with the frame and adjustable to terminate at a selected position on the view sheet for marking a particular detail of the view seen through that sheet to determine a subsequent position of the view finder with respect to the view.

2. A sketching device including a view finder comprising a frame, a transparent view sheet carried thereby, the frame being formed with a series of openings, and a rod slidable in said openings and adjustable with respect to the view sheet to indicate a particular point on said view sheet to serve as a guide for subsequent uses of the view sheet in connection with the same view.

3. A sketching device including a frame, a transparent view sheet carried thereby, said view sheet bearing lines dividing the same into segregated spaces, and a rod movably mounted on the frame to permit one end thereof to cooperate with any particular point on the view sheet to serve as a guide in the subsequent use of the view sheet for the same view.

4. A sketching device including a frame, a transparent view sheet carried thereby, said view sheet being marked with lines arranged at right angles to each other to divide the view sheet into a series of rectangular spaces, one edge of the frame being formed with openings registering with certain of the lines on the view sheet, and guide rods freely slidable in any of said openings.

JAMES J. McDONALD. [L. S.]